(12) United States Patent
Milliken

(10) Patent No.: US 8,335,224 B1
(45) Date of Patent: Dec. 18, 2012

(54) DATA-BUFFERING APPARATUS AND METHOD

(75) Inventor: Walter Clark Milliken, Dover, NH (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 3000 days.

(21) Appl. No.: 10/230,658

(22) Filed: Aug. 28, 2002

Related U.S. Application Data

(60) Provisional application No. 60/328,865, filed on Oct. 12, 2001.

(51) Int. Cl.
*H04L 12/28* (2006.01)
(52) U.S. Cl. ........... 370/428; 370/412; 370/419; 710/53
(58) Field of Classification Search .................. None
See application file for complete search history.

(56) References Cited

U.S. PATENT DOCUMENTS

| | | | | |
|---|---|---|---|---|
| 5,809,078 A | * | 9/1998 | Tani et al. | 375/259 |
| 6,076,137 A | * | 6/2000 | Asnaashari | 711/103 |
| 6,327,639 B1 | * | 12/2001 | Asnaashari | 711/103 |
| 6,631,136 B1 | | 10/2003 | Chowdhury et al. | |
| 6,725,351 B1 | * | 4/2004 | Shimizu | 711/173 |
| RE38,902 E | | 11/2005 | Srisuresh et al. | |
| 7,042,834 B1 | | 5/2006 | Savage | |

OTHER PUBLICATIONS

T.N. Vijaykumar, Low-power circuits increasingly needed in wireless age, http://www.purdue.edu/UNS/html4ever/001027.vijay.lowpower.html, Jun. 2001, 4 pages.
Cisco Systems, Cisco 100000 Series Six-Port Channelized T3 Interface Module, Data Sheet, 1992-2001, 4 pages.
Cisco Systems, Cisco 10000 Series Performance Routing Engine, Data Sheet, 1992-2001, 6 pages.

* cited by examiner

*Primary Examiner* — Bob Phunkulh
(74) *Attorney, Agent, or Firm* — Ropes & Gray LLP

(57) ABSTRACT

A data-buffering apparatus (100) having two buffers (206, 200) and configured to conserve power is disclosed. When a block of data (202) having a short block length (406') is to be buffered, the block of data (202) is buffered by a small primary buffer (206) and a large secondary buffer (200) is deactivated. When a block of data (202) having a long block length (406") is to be buffered, the large secondary buffer (200) is activated and the block of data (202) is buffered by both buffers (206,200). As there are typically many more blocks of data (202) having short block lengths (406') than long block lengths (406"), the secondary buffer (200) is activated only a small fraction of the time.

26 Claims, 5 Drawing Sheets

DATA-BUFFERING APPARATUS AND METHOD

RELATED INVENTION

The present invention claims benefit under 35 U.S.C. §119 (e) to "Low Power Buffering System," U.S. Provisional Patent Application Ser. No. 60/328,865, filed 12 Oct. 2001, which is incorporated by reference herein.

TECHNICAL FIELD OF THE INVENTION

The present invention relates to the field of data buffering. More specifically, the present invention relates to the field of data buffering using selectable buffers.

BACKGROUND OF THE INVENTION

In routers and other network devices, queuing stages are typically used to control and buffer the data being routed. The buffers of such queuing stages are of necessity at least as large as the largest data block to be buffered. Buffers of 16 MB (megabytes) or larger are common.

These buffers are often realized in dynamic random-access memory (DRAM) chips to maintain buffering speed and data throughput. Queuing stages utilizing such DRAM buffers typically consume a significant amount of power. One such state-of-the-art device (as of the time of this discussion) consumes in excess of 13 watts per port, i.e., per queuing stage. The consumption of power generates heat, and that heat must be dissipated.

In many installations, large numbers of queuing stages are used. The power consumed in such an installation may generate a considerable amount of heat. A considerable effort may therefore be required to dissipate the generated heat.

A typical land-based Internet server installation, for example, may use a plurality of conventional equipment racks to house routers. Experience has shown that each such rack may safely dissipate up to 10 kilowatts using conventional forced-air cooling. If more than 10 kilowatts is to be dissipated, then exotic heat dissipation techniques may become necessary (e.g., liquid or cryogenic cooling).

Density is an important factor for functionality of operation. The more queuing stages that can be placed in a given location, the easier it is to connect, operate, and maintain the system. In the state-of-the-art system discussed hereinbefore, 36 queuing stages may be incorporated into a single rack panel (a single chassis), and 6 panels may be incorporated into a single equipment rack. This produces a power consumption in excess of 2.8 kilowatts per rack.

Queuing stages do not operate in isolation. Associated components, such as interface modules, are typically required. In practice, the queuing stages occupy approximately half of the rack, with the associated components occupying the remainder. These associated components will often more than double the power consumption. In such installations, total power consumed per rack is typically between one-half and two-thirds of the maximum allowable rack power.

Exotic cooling systems, such as liquid or cryogenic cooling systems, may allow a significant increase in rack-component density. Unfortunately, such exotic cooling systems present several problems. Exotic cooling systems all tend to be complex thermodynamic systems. These systems may include pumps, compressors, condensers, coolant storage tanks, plumbing, etc. This complexity requires space, which is often at a premium. Additionally, such thermodynamic systems may suffer from inherent inefficiencies, resulting in an increase in overall energy consumption.

Complex systems are typically less robust than simple systems. Exotic cooling systems are much more complex, and therefore less robust, than simple forced-air cooling systems. A less robust system has a shorter mean time between failures (MTBF) than a simple system. Exotic cooling systems therefore fail more often than simple forced-air cooling systems.

Besides occurring more often, a failure in an exotic cooling system may be different in kind from a failure in a forced-air system. The failure of an exotic cooling system may result in a destructive thermal cascade failure of the devices cooled by the system.

To compensate for decreased MTBF and to circumvent thermal cascade failure, exotic cooling systems are typically redundant. This redundancy further increases complexity, cost, and power consumption.

A typical Internet server installation may contain many such equipment racks, therefore consuming tens or even hundreds of kilowatts of power. For example, a 4320-channel switching center may have twenty 216-port equipment racks, and would consume in excess of 56 kilowatts for queuing-stage buffers alone. Dissipation of the generated heat from such quantities of power often poses a significant problem.

Additionally, energy costs money. Assuming continuous operation, the 4320-channel switching center consumes in excess of 40,000 kWh (kilowatt-hours) of energy per month for its queuing-stage buffers, which may represent a significant cost.

SUMMARY OF THE INVENTION

Accordingly, it is an advantage of the present invention that a data-buffering apparatus and method is provided.

It is another advantage of the present invention that a data-buffering apparatus is provided that has a small primary buffer and a large secondary buffer.

It is another advantage of the present invention that a data-buffering apparatus is provided that renders the secondary buffer inoperative when the primary buffer is capable of buffering an entire block of data.

It is another advantage of the present invention that a data-buffering apparatus is provided that renders the secondary buffer operative when the primary buffer is incapable of buffering an entire block of data.

The above and other advantages of the present invention are carried out in one form by a switching center having a data-buffering apparatus configured to buffer a block of data having a variable block length. The data-buffering apparatus incorporates a queuing logic unit, a first buffer coupled to the queuing logic unit and configured to buffer at least a first portion of the block of data, and a second buffer coupled to the queuing logic unit and the first buffer. The second buffer is configured to be rendered inoperative when the first buffer is capable of buffering all of the block of data, and, to be rendered operative to buffer a second portion of the block of data when the first buffer is incapable of buffering all of the block of data.

The above and other advantages of the present invention are carried out in another form by a data-buffering method configured to conserve power when buffering a block of data having a variable block length. The method includes routing the block of data though a data-buffering apparatus having a first buffer and a second buffer, buffering a first portion of the block of data in the first buffer during the routing activity, deactivating the second buffer to render the second buffer inoperative when the block length is less than a buffer length of the first buffer, activating the second buffer to render the second buffer operative when the block length is greater than the buffer length of the first buffer, and buffering a second portion of the block of data in the second buffer during the routing activity when the second buffer is operative.

BRIEF DESCRIPTION OF THE DRAWINGS

A more complete understanding of the present invention may be derived by referring to the detailed description and claims when considered in-connection with the Figures, wherein like reference numbers refer to similar items throughout the Figures, and:

DETAILED DESCRIPTION OF THE PREFERRED EMBODIMENTS

Figure 1:
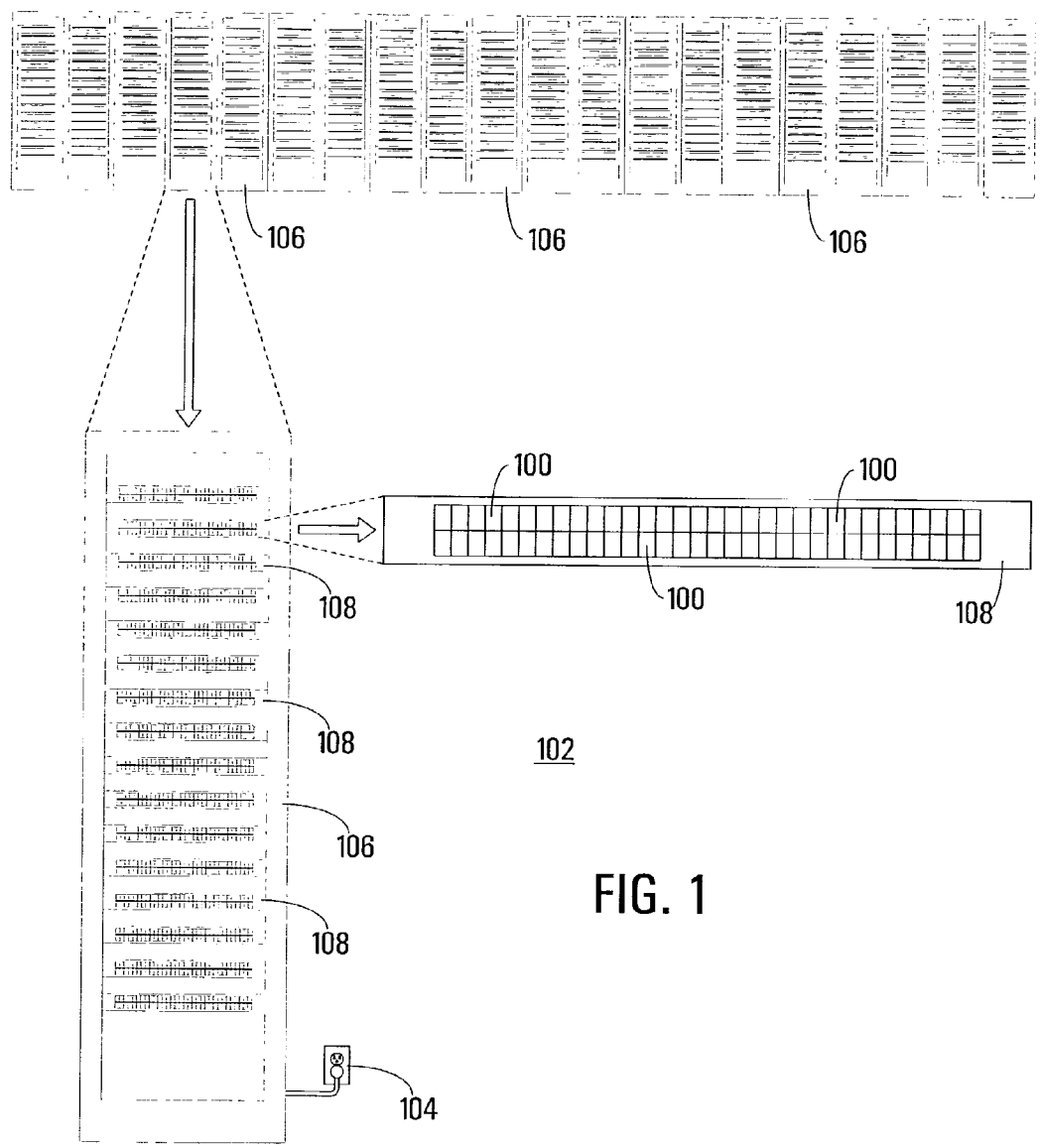
FIG. 1 shows a schematic view depicting a plurality of data-buffering apparatuses used in a switching center in accordance with a preferred embodiment of the present invention.

FIG. 1 shows a schematic view depicting a plurality of data-buffering apparatuses 100 used in a switching center 102 in accordance with a preferred embodiment of the present invention.

FIG. 1 depicts a router portion of a switching center 102. A multiplicity of data-buffering apparatuses 100 may be included in switching center 102. In the preferred embodiment, switching center 102 is part of a communications system (e.g., a Transmission Control Protocol over Internet Protocol (TCP/IP) communication system) where each data-buffering apparatus 100 may be configured as a queuing stage in a router.

In one exemplary embodiment (FIG. 1), switching center 102 is a fixed-location (i.e., land-based) 20,480-channel center drawing power from a public-utility power network 104 (represented in FIG. 1 by a conventional duplex outlet). Switching center 102 incorporates twenty equipment racks 106, where each equipment rack 106 incorporates sixteen router panels 108, and where each router panel 108 incorporates 224 data-buffering apparatuses 100. As will be discussed hereinafter, each data-buffering apparatus 100 consumes less than 1.5 watts. This results in a total queuing-stage power consumption of less than 31 kilowatts, i.e., less than 1.5 kilowatts per equipment rack 106.

The use of data-buffering apparatuses 100 of the present invention makes possible the density of switching center 102 as depicted in FIG. 1. In one example of the prior art, an equivalent switching center would have required 95 equipment racks, where each equipment rack would have 6 router panels, and where each router panel would have 36 queuing stages (the prior art equivalent of data-buffering apparatuses 100). Each prior art queuing stage consumes in excess of 13 watts. This results in a total queuing-stage power consumption in excess of 266 kilowatts, i.e., in excess of 2.8 kilowatts per equipment rack) for 20,480 queuing stages.

Those skilled in the art will appreciate that the power savings of data-buffering apparatus 100 (discussed hereinafter) readily allows an increase in channel density for a given power budget, a decrease in power consumption for a given density, or a combination thereof. For example, if the criteria is assumed to be the ability to dissipate generated heat using conventional forced-air cooling, a rack density far in excess of that demonstrated in FIG. 1 is possible.

Figure 2:
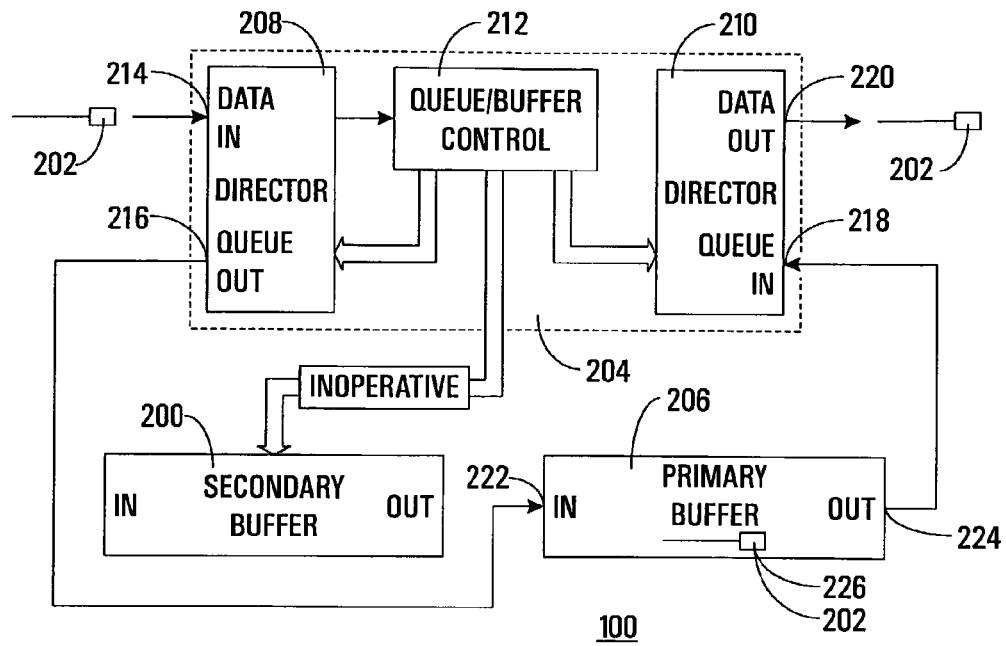
FIG. 2 shows a block diagram depicting a data-buffering apparatus with an inoperative secondary buffer in accordance with a preferred embodiment of the present invention.
Figure 3:
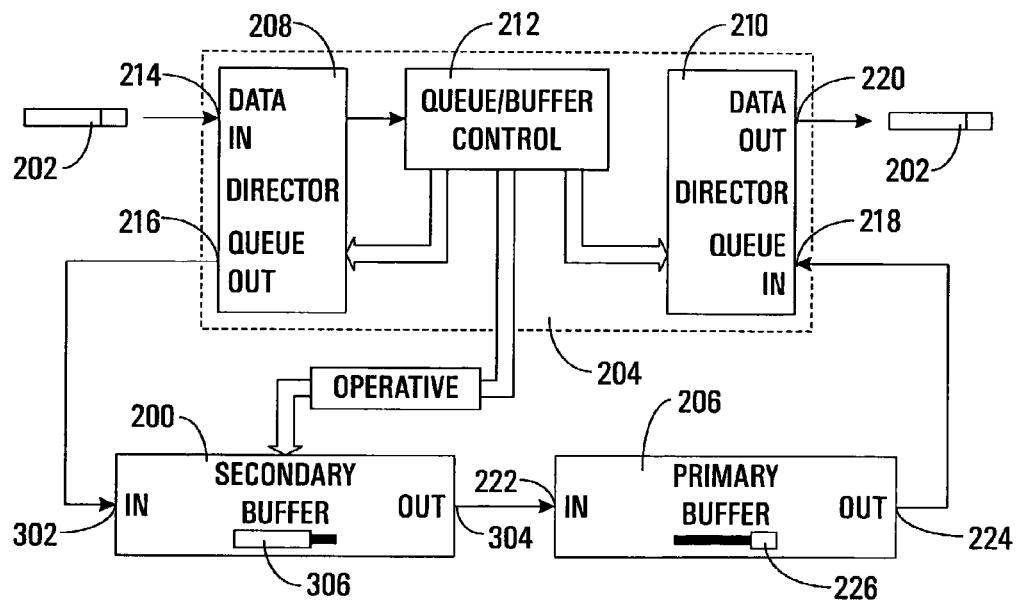
FIG. 3 shows a block diagram depicting a data-buffering apparatus with an operative secondary buffer in accordance with a preferred embodiment of the present invention.
Figure 4:
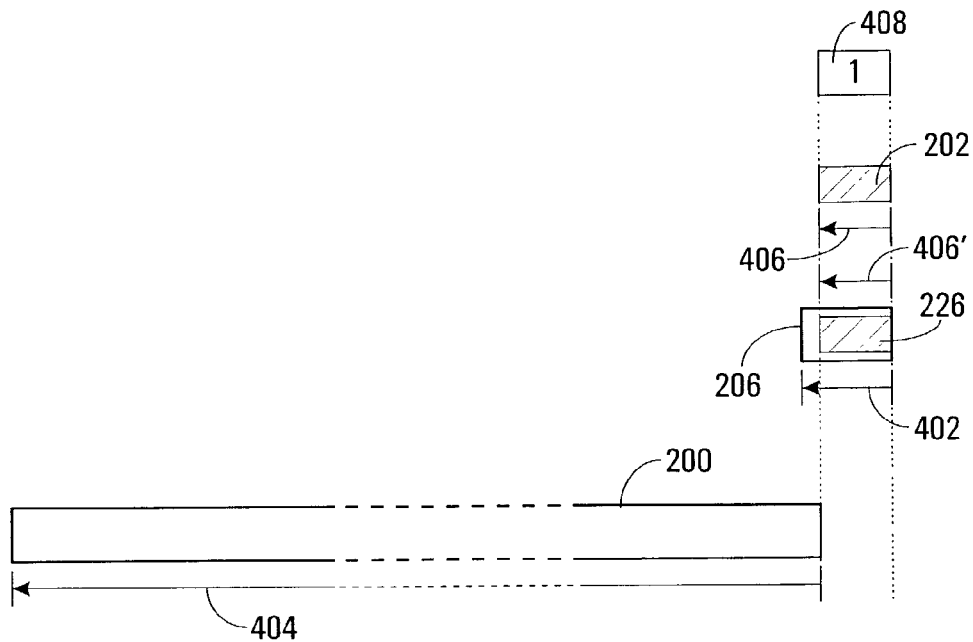
FIG. 4 shows a chart demonstrating lengths of buffers and blocks of data for the data-buffering apparatus of FIG. 2 in accordance with a preferred embodiment of the present invention.
Figure 5:
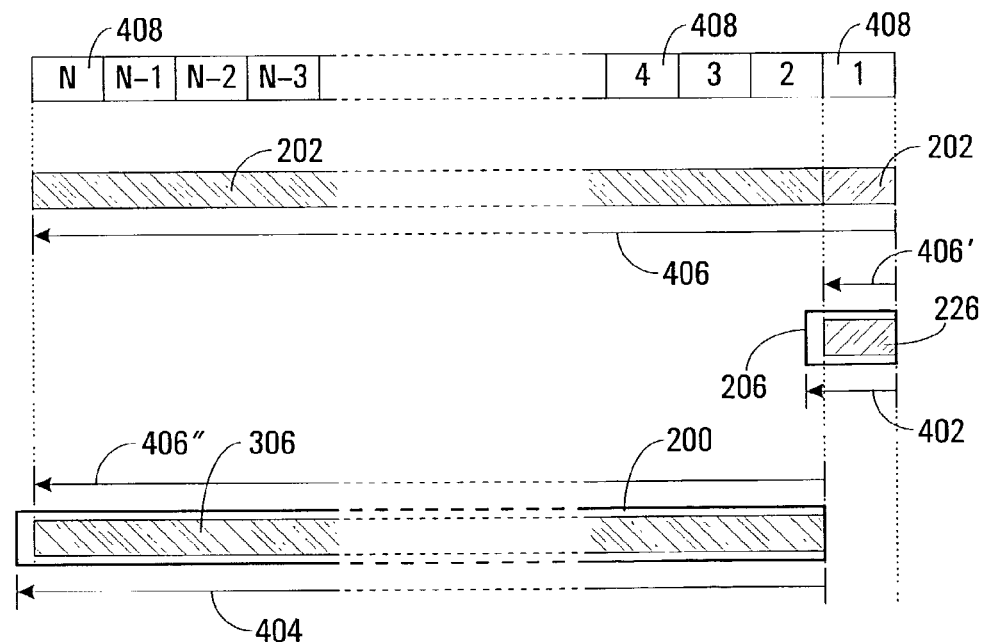
FIG. 5 shows a chart demonstrating lengths of buffers and blocks of data for the data-buffering apparatus of FIG. 3 in accordance with a preferred embodiment of the present invention.

FIGS. 2 and 3 show block diagrams depicting data-buffering apparatus 100 with an inoperative (FIG. 2) and operative (FIG. 3) secondary buffer 200. FIGS. 4 and 5 show charts demonstrating a primary buffer length 402, a secondary buffer length 404, and a block length 406 for data-buffering apparatus 100 as depicted in FIGS. 1 and 3, respectively. The following discussion refers to FIGS. 2, 3, 4, and 5.

Data-buffering apparatus 100 is configured to buffer a block of data 202. As shown in FIGS. 2 and 3, data-buffering apparatus 100 is made up of a queuing logic unit 204, a primary buffer 206, and secondary buffer 200.

Queuing logic unit 204 is made up of an input director 208, and output director 210, and a queue/buffer control element 212. Input director 208 has a data input 214 configured to receive block of data 202, and a queue output 216 configured to pass block of data 202 to primary and secondary buffers 206 and 200. Output director 210 has a queue input 218 configured to receive block of data 202 from primary and secondary buffers 206 and 200, and a data output 220 configured to dispatch block of data 202.

Primary buffer 206 has a predetermined primary buffer length 402 (FIGS. 4 and 5), where primary buffer length 402 is a fixed length of primary buffer 206 in bytes. Primary buffer 206 also has a primary buffer input 222 coupled to one of queuing logic unit 204 and secondary buffer 200, and a primary buffer output 224 coupled to queuing logic unit 204.

Similarly, secondary buffer 200 has a predetermined secondary buffer length 404 (FIGS. 4 and 5) greater than primary buffer length 402, where secondary buffer length 404 is a fixed length of secondary buffer 200 in bytes. Secondary buffer 200 also has a secondary buffer input 302 coupled to queuing logic unit 204, and a secondary buffer output 304 coupled to primary buffer 206.

Block of data 202 has a variable block length 406. Block of data 202 is an arbitrary one of a series of blocks of data 202 to be buffered by data-buffering apparatus 100. Block length 406 is a length of that arbitrary block of data 202 in bytes, and is independent of block length 406 for other blocks of data 202.

Block of data 202 has a short block length 406' for a majority of blocks of data 202, and has a long block length 406" for an occasional block of data 202. Short block length 406' is defined as that block length 406 which encompasses at least 90 percent and preferably at least 99 percent of all blocks of data 202 received.

In the preferred embodiment, data-buffering apparatus 100 is used as a queuing stage. In this embodiment, apparatus 100 is configured to buffer information packets 408. Block of data 202 contains at least one and no more than an arbitrary maximal number N of information packets 408. For example, experience has shown that greater than 99 percent of all blocks of data 202 in TCP/IP communications are made up of a single TCP/IP information packet 408. The remaining blocks of data 202 contain more than 1 and up to N information packets 408.

It follows, therefore, that short block length 406' should be one information packet 408, while long block length 406" needs be between two and N information packets 408. Expressed differently, short block length 406' may be a few tens of bytes, while long block length 406" is greater than short block length 406' and up to several megabytes.

Primary buffer 206 is configured to buffer a block of data 202 having a small block length 406'. That is, primary buffer length 402 is predetermined to be greater than or equal to small block length 406', at least one information packets 408 in the preferred embodiment.

Similarly, secondary buffer 200 is configured to buffer any block of data 202 having a long block length 406". Since block length 406 is variable, secondary buffer length 404 is predetermined to be greater than or equal to the largest long block length 406", at least N information packets 408 in the preferred embodiment.

Mathematically speaking, secondary buffer length 404 may be less than a maximum long block length 406" as long as primary buffer 206 and secondary buffer 200 together have combined buffer lengths 402 and 404 able to buffer a block of data 202 of maximal long block length 406 (N information packets 408 in the preferred embodiment). Those skilled in the art will appreciate that in practice, however, secondary buffer length 404 (several megabytes) is so much greater than primary buffer length 402 (a few tens of bytes) that primary buffer 206 may be safely ignored.

Figure 6:
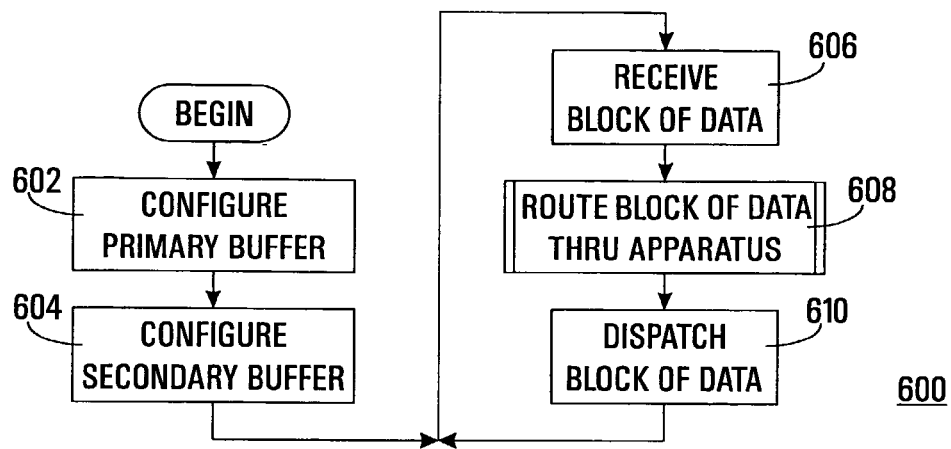
FIG. 6 shows a flow chart depicting a data-buffering process in accordance with a preferred embodiment of the present invention.

FIG. 6 shows a flow chart depicting a data-buffering process 600 in accordance with a preferred embodiment of the present invention. The following discussion refers to FIGS. 2, 3, 4, 5, and 6.

Data-buffering process 600 buffers block of data 202 in data-buffering apparatus 100. In a task 602, primary buffer 206 is configured. In task 602, predetermined primary buffer length 402 is established. Primary buffer 206 is configured so primary buffer length 402 is greater than or equal to short block length 406' and less than long block length 406". Primary buffer 206 buffers a primary portion 226 of block of data 202. Primary buffer 206 is capable of buffering all of block of data 202 when block length 406 is short block length 406', i.e., at least one information packet 408 in the preferred embodiment. Therefore, primary portion 226 of block of data 202 encompasses all of block of data 202 when block length 406 is short block length 406'.

Primary buffer 206 is incapable of buffering all of block of data 202 when block length 406 is greater than short block length 406', i.e., is long block length 406". In this case, primary buffer 206 buffers primary portion 226 of block of data 202, where a length of primary portion is substantially equal to short block length 406'. Therefore, primary portion 226 of block of data 202 encompasses less than all of block of data 202 when block length 406 is long block length 406".

In addition, the type of primary buffer 206 is configured in task 602. It is desirable that primary buffer 206 be a low-power, fast buffer. Typically, therefore, primary buffer 206 is implemented as a first in, first-out (FIFO) shift register or a static random-access memory (SRAM) because these types of memory can be configured to consume very low power. Because of power consumption, primary buffer 206 is desirably implemented as a memory type other than dynamic random-access memory (DRAM), which consumes greater amounts of power due to refresh circuitry.

Those skilled in the art will appreciate that it is not a requirement of the present invention that primary buffer 206 be implemented in a specific technology. Primary buffer 206 may be implemented in any desired manner without departing from the spirit of the present invention.

In a task 604 of process 600, secondary buffer 200 is configured. In task 604, predetermined secondary buffer length 404 is established. Secondary buffer 200 is configured so secondary buffer length 404 is greater than or equal to the difference of the maximum size of long block length 406" less short block length 406'. Secondary buffer 200 is therefore capable of buffering a secondary portion 306 of block of data 202, where secondary portion 306 is equal to the difference of all of block of data 202 less primary portion 226 buffered by primary buffer 206, i.e., (N−1) information packets 408 in the preferred embodiment. Primary and secondary buffers 206 and 200 are configured in tasks 602 and 604 to together buffer all of block of data 202, i.e., N information packets 408 in the preferred embodiment. Therefore, primary and secondary portions 226 and 306 of block of data 202 together encompass all of block of data 202.

In addition, the type of secondary buffer 200 is configured in task 604. It is desirable that secondary buffer 200 be a fast, high-density buffer. Typically, therefore, secondary buffer 200 is implemented as a DRAM.

Those skilled in the art will appreciate that it is not a requirement of the present invention that secondary buffer 200 be implemented in a specific technology. Secondary buffer 200 may be implemented in any desired manner without departing from the spirit of the present invention.

It will be appreciated that tasks 602 and 604 represent choices made during the design and manufacture of data-buffering apparatus 100.

In process 600, a task 606 receives block of data 202 (FIGS. 2 and 3) at data input 214 of input director 208 of queuing logic unit 204. A subprocess 608 then routes block of data 38 through data-buffering apparatus 100. Finally, a task 610 dispatches now-buffered block of data 38 from data output 220 of output director 210 of queuing logic unit 204. Task 606, subprocess 608, and task 610 together form a loop to process each block of data 202 presented to data-buffering apparatus 100.

Figure 7:
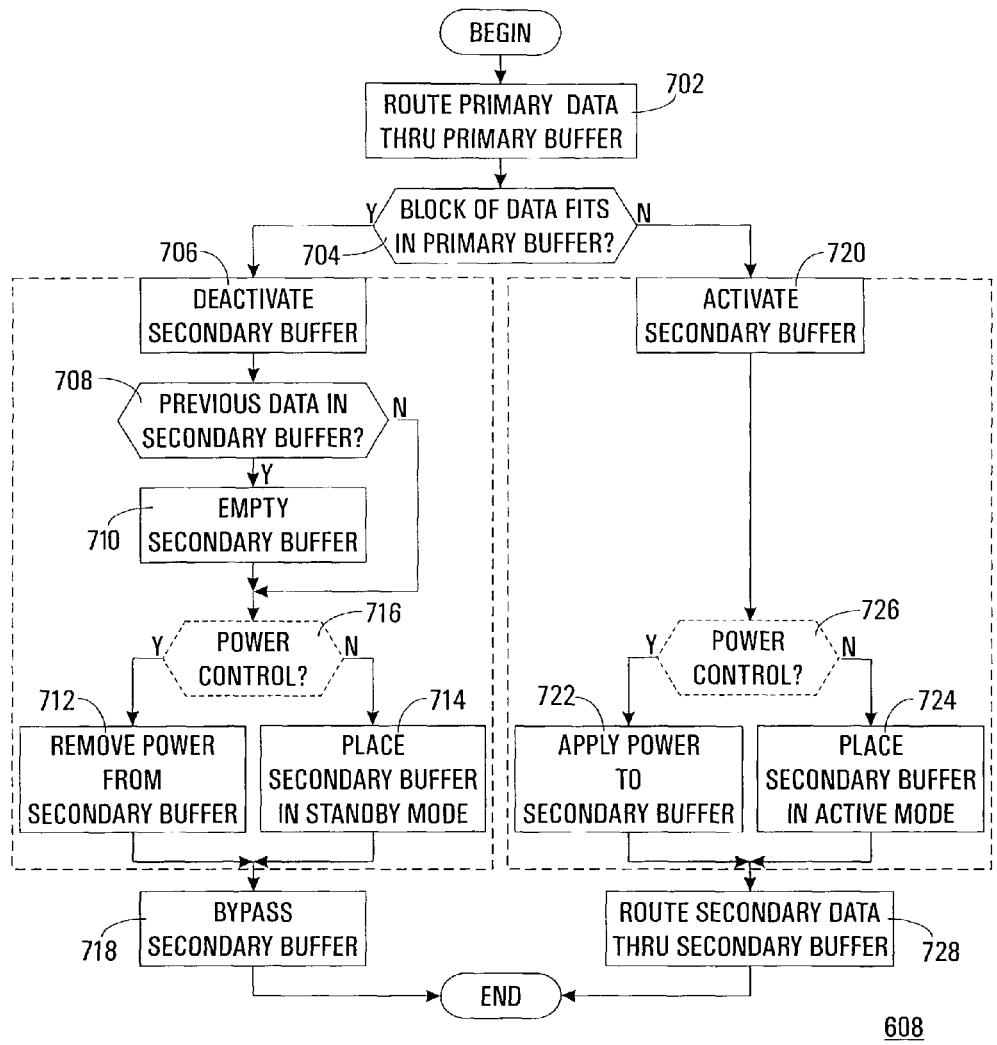
FIG. 7 shows a flow chart depicting a data-routing subprocess of the data-buffering process of FIG. 6 in accordance with a preferred embodiment of the present invention.

FIG. 7 shows a flow chart depicting data-routing subprocess 608 in accordance with a preferred embodiment of the present invention. The following discussion refers to FIGS. 2, 3, 4, 5, and 7.

FIG. 2 depicts data-buffering apparatus 100 when secondary buffer 200 is inoperative, and FIG. 3 depicts apparatus 100 when secondary buffer 200 is operative. For simplicity, FIGS. 2 and 3 depict apparatus 100 as though both primary and secondary buffers 206 and 200 were FIFO buffers. Those skilled in the art will appreciate that apparatus 100 would not normally be so implemented. Desirably, at least secondary buffer 200 would be implemented as random-access memory (RAM), most commonly DRAM. Primary buffer 206 may be implemented as RAM, most commonly SRAM, or as a FIFO register.

It will be appreciated that RAM may function in a manner analogous to a FIFO buffer using techniques well known to those skilled in the art. This allows the simplified structures depicted in FIGS. 2 and 3 to be valid for this discussion.

In subprocess 608, a task 702 routes primary portion 226 of block of data 202 (PRIMARY DATA) through primary buffer 206. This serves to buffer primary portion 226. Queue/buffer control element 212 monitors input director 208. When queue/buffer control element 212 detects the start of block of data 202, queue/buffer control element 212 causes queue output 216 to be coupled to primary buffer input 222 and primary buffer output 224 to be coupled to queue input 218, as in FIG. 2. This directs primary portion 226 of block of data 202 to primary buffer 206.

A query task 704 then determines if all of block of data 202 will fit within primary buffer 206, i.e., if block length 406 is short block length 406'. Queue/buffer control element 212 determines if block length 406 is greater than short block length 406'. This may be accomplished by simply counting bytes as block of data 202 is received. Queue/buffer control element 212 then activates or deactivates secondary buffer 200 and determines signal routing within data-buffering apparatus 100.

If query task 704 determines that buffer length 406 is short buffer length 406', then queue/buffer control element 212 leaves queue output 216 coupled to primary buffer input 222 and primary buffer output 224 coupled to queue input 218 as in FIG. 2.

A hypertask 706 (i.e., a task of tasks) then deactivates secondary buffer 200, thereby rendering secondary buffer 200 inoperative. Within hypertask 706, a query task 708 determines if secondary buffer 200 contains any portion of a previous block of data 202 not yet dispatched. If so, a task 710 empties secondary buffer 200 before deactivation.

Those skilled in the art will appreciate that some small amount of power may be conserved by deactivating primary buffer 206 when primary buffer 206 is empty and secondary buffer 200 still contains valid data. The deactivation and activation of primary buffer 206, not discussed, is analogous to the activation and deactivation of secondary buffer 200, discussed herein. The deactivation and activation of primary buffer 206 does not depart from the spirit of the present invention.

After task 710, or if query task 708 determines that secondary buffer 200 does not contain data, secondary buffer 200 is deactivated. This is accomplished by either a task 712 to remove power from secondary buffer 200 or a task 714 to place secondary buffer 200 in a standby mode. The choice of task 712 or 714 is made by a pseudotask 716. Pseudotask 716 is made during the design of data-buffering apparatus 100, where a decision is made to use power control or standby control. If the decision was to use power control, then queue/buffer control element 212 activates a switch (not shown) to remove power from secondary buffer 200 in task 712. If the decision was to use standby control, then memory having a low-power standby mode is used for secondary buffer 200 and queue/buffer control element 212 places secondary buffer 200 into standby mode in task 714. Secondary buffer 200 is thereby rendered un-energized or otherwise inoperative.

Those skilled in the art will appreciate that secondary buffer 200 may already be inoperative when hypertask 706 is encountered. In this case, hypertask 706, and subordinate tasks 708, 710, 712, 714, and 716, may be omitted. Alternatively, if secondary buffer 200 is already inoperative when hypertask 706 is encountered, executing hypertask 706 merely affirms the inoperative condition.

After task 712 or task 714, a do-nothing task 718 bypasses inoperative secondary buffer 200. If all of block of data 202 can be buffered in primary buffer 206, then there remains no data to be buffered in secondary buffer 200.

If query task 704 determines that buffer length 406 is greater than short buffer length 406', i.e., is long buffer length 406", then queue/buffer control element 212 causes queue output 216 to be coupled to secondary buffer input 302, secondary buffer output 304 to be coupled to primary buffer input 222, and primary buffer output 224 to be coupled to queue input 218 as in FIG. 3.

A hypertask 720 then activates secondary buffer 200, thereby rendering secondary buffer 200 operative. Within hypertask 720, this is accomplished by either a task 722 to apply power to secondary buffer 200 or a task 724 to place secondary buffer 200 in an active mode. The choice of task 722 or 724 is made by a pseudotask 726. Like pseudotask 716 discussed hereinbefore, pseudotask 726 is a part of the decision made during the design of data-buffering apparatus 100 to use power control or standby control. If the decision was to use power control, then queue/buffer control element 212 activates the switch (not shown) to apply power to secondary buffer 200 in task 722. If the decision was to use standby control, then queue/buffer control element 212 places secondary buffer 200 into active mode (i.e., out of standby mode) in task 724. Secondary buffer 200 is thereby rendered energized or otherwise operative.

Those skilled in the art will appreciate that secondary buffer 200 may already be operative when hypertask 720 is encountered. In this case, hypertask 720, and subordinate tasks 722, 724, and 726, may be omitted. Alternatively, if secondary buffer 200 is already operative when hypertask 720 is encountered, executing hypertask 720 merely affirms the operative condition.

After task 722 or 724, a task 728 routes secondary portion 306 of block of data 202 (SECONDARY DATA) through secondary buffer 200. This serves to buffer secondary portion 306.

Figure 8:
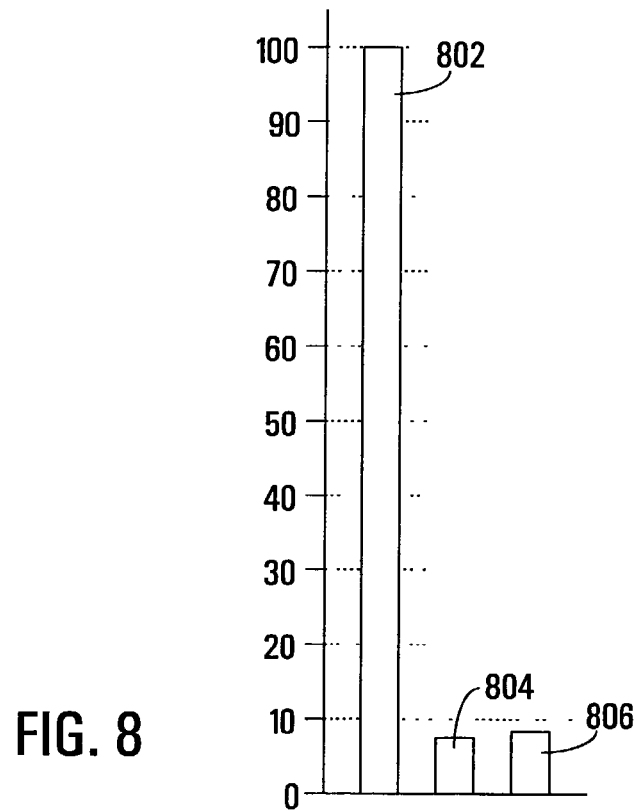
FIG. 8 shows a chart demonstrating power consumption in the data-buffering apparatuses of FIGS. 2 and 3 in accordance with a preferred embodiment of the present invention.

FIG. 8 shows a chart demonstrating power consumption in the data-buffering apparatuses of FIGS. 2 and 3 in accordance with a preferred embodiment of the present invention. The following discussion refers to FIGS. 2, 3, and 8.

When operative, secondary buffer 200 consumes a predetermined amount of power 802. When operative, the power consumption of secondary buffer 200 is in line with the power consumption of the prior art. That is, for secondary buffer 200 of a size substantially equal to the buffer of a prior art queuing stage, secondary buffer 200 draws a substantially equivalent amount of power. The predetermined amount of power 802 for a 16-megabyte secondary buffer 200 is no more than 20 watts, and desirably less than 15 watts. When secondary buffer 200 is operative, the quantity of power 804 consumed by primary buffer 206 is negligible by comparison.

When secondary buffer 200 is inoperative, the amount of power 806 consumed by primary and secondary buffers 206 and 200 together is no more than half of predetermined quantity of power 802, and normally less than 10 percent of predetermined amount of power 802, i.e., less than 2 watts. A judicious selection of the components and design of primary and secondary buffers 206 and 200 may produce a power consumption 806 of less than 1 percent of predetermined amount of power 802, i.e., less than 200 milliwatts.

As discussed hereinbefore, at least 90 percent and often at least 99 percent of blocks of data 202 have short block lengths 406'. Therefore, no more than 10 percent and preferably no more than 1 percent of blocks of data 202 have long block lengths 406". Data-buffering process 600 renders secondary buffer 200 operative only for blocks of data 202 having long block lengths 406". Data-buffering process 600 is therefore configured to conserve power.

When implemented in DRAM, the power consumed by secondary buffer 200 when operative rises very slowly as secondary buffer length 404 increases. This allows an alternative embodiment (not shown) in which multiple data-buffering apparatuses 100 are grouped together into secondary buffer 200. By using this alternative embodiment, additional power and complexity may be saved by sharing queue/buffer control elements 212 (processors). The use of this alternative embodiment does not depart from the spirit of the present invention.

Those skilled in the art will appreciate that, while the preferred embodiment discussed herein depicts the transmission of packet data, specifically Transmission Control Protocol over Internet Protocol (TCP/IP) packet data over a TCP/IP communication system, this is not a requirement of the present invention. The present invention may be realized in other cell or packet-switching communications systems without departing from the spirit of the present invention.

It will also be appreciated that the present invention may be realized as a means of performing an elastic buffering function (e.g., as a FIFO buffer) with variable or different input and output clock rates. In such an embodiment, the term "packet" may be interpreted as the data queued between clock domains and for which the average to maximum queue occupancy ration may be relatively small.

It will further be appreciated that the preferred embodiment depicted herein depicts a blocked data scheme. In a typical blocked data scheme, a given block of data is fully processed before another block of data is accessed. This is not a requirement of the present invention. The present invention may be realized in a continuous-flow data scheme, wherein "packets" are continually entering and leaving the queue all the time, without departing from the spirit of the present invention.

In summary, the present invention teaches a data-buffering apparatus 100 and process 600. Data-buffering apparatus 100 has a small primary buffer 206 and a large secondary buffer 200. Secondary buffer 200 is rendered inoperative when primary buffer 206 is capable of buffering all of a block of data 202. Secondary buffer 200 is rendered operative only when primary buffer 206 is incapable of buffering all of block of data 202.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A data-buffering apparatus configured to buffer a block of data having a variable block length, said data-buffering apparatus comprising:
    a queuing logic unit;
    a first buffer coupled to said queuing logic unit and configured to buffer a first portion of said block of data; and
    a second buffer coupled to said queuing logic unit and said first buffer, wherein:
        said second buffer is deactivated to render said second buffer inoperative when said first buffer is capable of buffering all of said block of data;
        said second buffer is activated to render said second buffer operative and buffers a second portion of said block of data when said first buffer is incapable of buffering all of said block of data;
        said apparatus consumes a predetermined amount of power when said second buffer is rendered operative; and
        said apparatus consumes less than one-half of said predetermined amount of power when said second buffer is rendered inoperative.

2. A data-buffering apparatus as claimed in claim 1 wherein, when said second buffer is rendered inoperative:
    said first buffer has a buffer length;
    said block length is less than or equal to said buffer length; and
    said first portion of said block of data encompasses all of said block of data.

3. A data-buffering apparatus as claimed in claim 1 wherein, when said second buffer is rendered operative:
    said first buffer has a first buffer length;
    said second buffer has a second buffer length;
    said block length is greater than said first buffer length and less than or equal to a sum of said first buffer length and said second buffer length;
    said first portion of said block of data encompasses less than all of said block of data; and
    said first portion and said second portion of said block of data together encompass all of said block of data.

4. A data-buffering apparatus as claimed in claim 1 wherein, when said second buffer is rendered inoperative:
    said first buffer has a buffer input, a buffer output, and a buffer length at least as great as said block length, and a buffer; and
    said queuing logic unit comprises:
        an input director having a data input configured to receive said block of data, and having a queue output coupled to said buffer input; and
        an output director having a queue input coupled to said buffer output, and having a data output configured to dispatch said block of data.

5. A data-buffering apparatus as claimed in claim 1 wherein, when said second buffer is rendered operative;
    said first buffer has a first buffer input, a first buffer output, and a first buffer length less than said block length;
    said second buffer has a second buffer input, a second buffer output coupled to said first buffer input, and a second buffer length at least as great as a difference of said block length less said first buffer length; and
    said queuing logic unit comprises:
        an input director having a data input configured to receive said block of data, and having a queue output coupled to said second buffer input; and
        an output director having a queue input coupled to said first buffer output, and having a data output configured to dispatch said block of data.

6. A data-buffering apparatus as claimed in claim 1 wherein said second buffer comprises memory formed from dynamic random-access memory (DRAM) devices.

7. A data-buffering apparatus as claimed in claim 6 wherein said first buffer comprises memory formed from other than DRAM devices.

8. A data-buffering apparatus as claimed in claim 1 wherein:
    said apparatus is one of a plurality of queuing stages for a router in a communications system;
    said apparatus is configured to buffer information packets;
    said block of data contains at least one of said information packets; and
    when said block of data contains no more of said information packets than can be buffered by said first buffer, said first portion of said block of data encompasses all of said block of data.

9. A data-buffering apparatus as claimed in claim 8 wherein:
   said block of data contains no more than a maximal number of said information packets; and
   when said block of data contains more of said information packets than can be buffered by said first buffer:
   said first portion of said block of data encompasses less than all of said block of data; and
   said second portion of said block of data encompasses all of said block of data less said first portion of said block of data.

10. A data-buffering apparatus as claimed in claim 1 wherein said apparatus is one of a multiplicity of said apparatuses in a switching center.

11. A data-buffering apparatus as claimed in claim 10 wherein said switching center is a fixed-location switching center drawing power from a public-utility power network.

12. A data-buffering apparatus as claimed in claim 1 wherein:
   said second buffer comprises at least 16 megabytes of dynamic random-access memory;
   said predetermined amount of power is less than twenty watts; and
   said apparatus consumes less than 2 watts when said second buffer is rendered inoperative.

13. A data-buffering apparatus as claimed in claim 1 wherein:
   said second buffer comprises a buffer; and when said second buffer is inoperative, said buffer is either placed in a standby mode or turned off.

14. A data-buffering apparatus as claimed in claim 1 wherein:
   said second buffer comprises a buffer; and
   said buffer is placed in a standby mode to render said second buffer inoperative.

15. A data-buffering apparatus as claimed in claim 1 wherein:
   said second buffer comprises a buffer; and
   said buffer is turned off to render said second buffer inoperative.

16. A data-buffering method configured to conserve power when buffering a block of data having a variable block length, said method comprising:
   a) routing said block of data through a data-buffering apparatus having a first buffer and a second buffer;
   b) buffering a first portion of said block of data in said first buffer during said routing activity a);
   c) deactivating said second buffer to render said second buffer inoperative when said block length is less than a buffer length of said first buffer, wherein deactivating said second buffer comprises removing power from said second buffer to render said second buffer inoperative;
   d) activating said second buffer to render said second buffer operative when said block length is greater than said buffer length of said first buffer; and
   e) buffering a second portion of said block of data in said second buffer during said routing activity a) when said second buffer is operative.

17. A data-buffering method as claimed in claim 16 wherein, when said second buffer is inoperative, said routing activity a) comprises:
   bypassing said second buffer; and
   routing said block of data through said first buffer.

18. A data-buffering method as claimed in claim 16 wherein, when said second buffer is operative, said routing activity a) comprises:
   routing said second portion of said block of data through said second buffer; and
   routing said first portion of said block of data through said first buffer.

19. A data-buffering method as claimed in claim 16 wherein said block of data contains no more than a maximal number of information packets, and wherein said method additionally comprises:
   configuring said first buffer to buffer a first quantity of said information packets; and
   configuring said second buffer to buffer a second quantity of said information packets, wherein said second quantity is at least said maximal number of said information packets less said first quantity.

20. A data-buffering method as claimed in claim 16 additionally comprising:
   configuring said first buffer as one of a first-in, first-out shift register and a static random-access memory; and
   configuring said second buffer as a dynamic random-access memory.

21. A data-buffering method as claimed in claim 16 additionally comprising, when said second buffer is operative and said buffering activity e) has caused said second buffer to buffer said second portion of said block of data, emptying said second buffer of said second portion of said block of data prior to said deactivating activity c).

22. A data-buffering apparatus configured to buffer a block of data having a variable block length, said apparatus comprising:
   a queuing logic unit incorporating an input director having a data input and a queue output, and an output director having a queue input and a data output, wherein said data input and said data output are configured to receive and dispatch said block of data, respectively;
   a first buffer coupled to said queuing logic unit and configured to buffer at least a first portion of said block of data; and
   a second buffer coupled to said queuing logic unit, wherein;
      said second buffer is deactivated to render said second buffer inoperative when said first buffer is capable of buffering all of said block of data;
      said second buffer is activated to render said second buffer operative when said first buffer is incapable of buffering all of said block of data;
      said apparatus consumes a predetermined amount of power when said second buffer is rendered operative; and
      said apparatus consumes less than one-half of said predetermined amount of power when said second buffer is rendered inoperative.

23. A data-buffering apparatus as claimed in claim 22 wherein, when said second buffer is rendered inoperative, said first buffer buffers all of said block of data as said first portion thereof, wherein said buffer has a buffer input coupled to said queue output, a buffer output coupled to said queue input, and a buffer length greater than or equal to said block length.

24. A data-buffering apparatus as claimed in claim 22 wherein, when said second buffer is rendered operative:

said first buffer buffers less than all of said block of data as said first portion thereof, wherein said first buffer has a first buffer input, a first buffer output coupled to said queue input, and a first buffer length less than said block length; and said second buffer buffers a second portion of said block of data, wherein said first portion and said second portion together encompass all of said block of data, and wherein said second buffer has a second buffer input coupled to said queue output, a second buffer output coupled to said first buffer input, and a second buffer length greater than or equal to a difference of said block length less said first buffer length.

25. A data-buffering apparatus as claimed in claim 22 wherein:

said second buffer comprises a buffer; and said buffer is placed in a standby mode to render said second buffer inoperative.

26. A data-buffering apparatus as claimed in claim 22 wherein:

said second buffer comprises a buffer; and said buffer is turned off to render said second buffer inoperative.

* * * * *